Aug. 6, 1929. W. R. CHAPIN 1,723,843
FAST SPEED CUTTER
Filed June 25, 1926
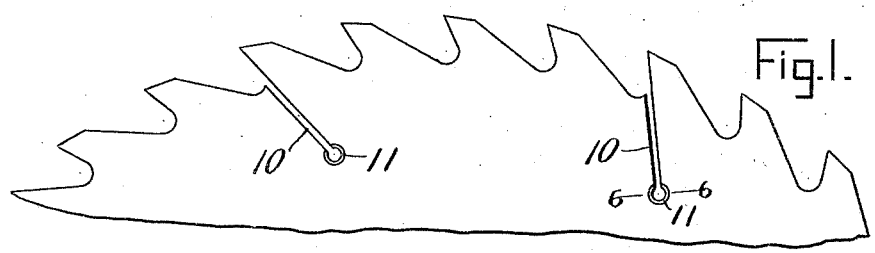
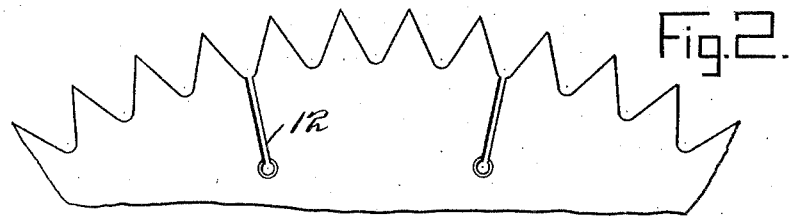
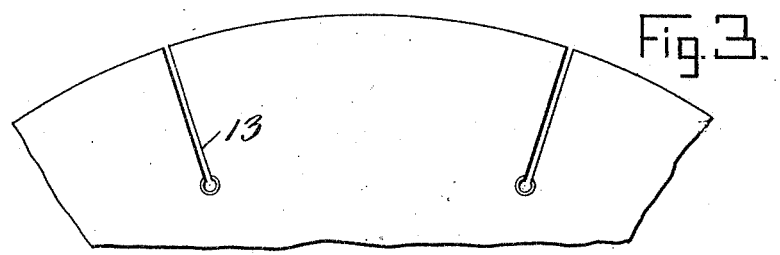
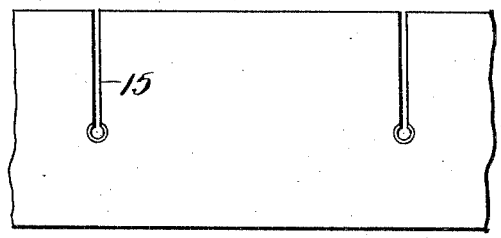
Inventor
William R. Chapin
By
Attorney Patented Aug. 6, 1929.

1,723,843

UNITED STATES PATENT OFFICE.

WILLIAM R. CHAPIN, OF INDIANAPOLIS, INDIANA, ASSIGNOR TO E. C. ATKINS & COMPANY, OF INDIANAPOLIS, INDIANA, A CORPORATION OF INDIANA.

FAST SPEED CUTTER.

Application filed June 25, 1926. Serial No. 118,591.

In the development of machines for the cutting of wood, paper, metals and the like by means of circular and band cutters, both of the saw type, plain or nicked edge type and the knife edge type, the tendency has been to increase the speed of the travel of the cutter and increase the driving power and feed per minute, thereby increasing the capacity of the machine. In recent times this speed has been developed to the point where the travel of the cutting edge through the work to be cut has attained upwards of two to four miles per minute. By reason of this terrific speed the edge of the saw, and other cutter blades, whether of the circular type or the band type, have been subjected to an unusual strain, not only because of the cutting operation but because of the speed of the cutter and the tendency of the metal of the cutter to fly in the direction which the speed would naturally impel it to travel. Such strain has been beyond the power of resistance of the cutters as heretofore commonly constructed, resulting in many of the cutter blades cracking and thus becoming useless. This has resulted in great loss because of the expensive character of the cutters, particularly those of large size, which are the most likely to be subjected to the breakage referred to.

The object of my said invention is to provide cutting blades for such high power cutting machines so constructed as to guard against the danger of cracking under the strain of the work above described, all as will be hereinafter more fully described and claimed.

Referring to the accompanying drawings, which are made a part hereof and on which similar reference characters indicate similar parts, Figure 1 is a segmental view of a circular saw of the "rip-saw" type, Figure 2, a similar view of a circular saw of the "cut-off-saw" type, Figure 3, a similar view of a circular knife, Figure 4, a section of a band saw, and Figure 5, a section of a band knife.

Figure 6 is a section through a perforation at the end of a slit.

Each of these cutting instruments is of a well known character, the saws and knives being used for different lines of cutting work, as is well known.

In each of the cutting blades 1 form a slit extending from the cutting edge back for a short distance into the blade. In Figure 1 these slits are indicated by the numerals 10 and extend in line with the front edge of the tooth back into the saw, terminating in a circular aperture 11 through the saw blade, each end of the circular aperture being counter-sunk, as shown. These slits are spaced at intervals, as indicated throughout the circumference of the saw and extend to something less than one-tenth of the diameter of the saw from the periphery of the saw. The slits do not therefore materially weaken the body of the saw.

In Figure 2 similar slits 12 are provided except they extend from the throat, between a pair of teeth, radially into the saw.

In the circular knife in Figure 3 similar slits 13 are provided, extending from the periphery or the cutting edge of the knife radially into the cutting blade.

In Figure 4 similar slits 14 are provided, these slits extending in line with the front face of the teeth the same as in Figure 1, and In Figure 5 a band knife is formed with similar slits 15 arranged at intervals extending from the cutting edge back into the cutting blade.

In each instance the slits terminate in a perforation and each end of the perforation is chamfered or countersunk as shown.

Extensive use of saws and cutters embodying my improvements as above outlined has demonstrated that it successfully overcomes the trouble heretofore referred to. Sufficient elasticity and expansion are provided in the blades so that the force developed under the fast speed spends itself in the spreading or expansion of the cutter before the cracking strain is reached. The circular aperture at the base of each slit tends to safeguard the blade against splitting beyond the slit and the countersunk edges of these perforations contribute further to this end.

In saws of this type the toothed portion becomes heated and tends to expand more rapidly than the rest of the saw increasing its circumference and causing radial cracks, under the strain of the centrifugal force generated by its speed. I therefore make provision for expansion of this part of the saw which also facilitates cooling thereof, without however unnecessarily weakening the slower travelling and less heated portions thereof, by radial slots extending only sufficiently far to provide for the unavoidable expansion of the rim part. I am aware that saws have been made having slits formed around the periphery and extending toward the center. In saws heretofore made along these lines the slits extended so far in that the saw was materially weakened. My slits extend inward only a relatively small percentage of the total diameter of the saw so that the saw is not weakened, and at the same time the slits provide for expansion due to the heating of the narrow outer edge of the saw.

It will be obvious to those skilled in the art that various changes may be made in my device without departing from the spirit of my invention, and I, therefore, do not limit myself to what is shown in the drawings and described in the specification, but only as set forth in the appended claims.

Having thus fully described my said invention, what I claim as new and desire to secure by Letters Patent, is:

1. A cutter blade for high speed cutters formed with slits at intervals throughout its extent the length of the slit being a small percentage of the total width of the cutter, the said slit terminating in perforations wider than the slits, substantially as set forth.

2. A circular cutter blade for high speed cutters formed with slits at intervals around its periphery, the slits extending back into the blade not more than approximately one-fifth of the radius of the blade, the slits providing for expansion of the blade during the heat of friction in cutting without materially weakening the blade, substantially as set forth.

3. A cutter blade for high speed cutters formed with slits at intervals around its periphery, the slits extending back into the blade not more than approximately one-fifth of the radius of the blade and terminating in perforations wider than the slit, the perforations having their edges chamfered or counter-sunk, substantially as set forth.

4. A cutter blade for high speed cutters formed with slits at intervals throughout its length, the slits extending back into the blade on a line with the front face of the teeth of the blade and terminating in perforations wider than the slits, the perforations having their edges chamfered, the length of the slits being a relatively small proportion of the diameter of the cutter, substantially as set forth.

In witness whereof, I have hereunto set my hand at Indianapolis, Indiana, this 14th day of June, A. D. nineteen hundred and twenty-six.

WILLIAM R. CHAPIN.